Feb. 13, 1968

A. C. WICKMAN 3,368,347

POWER TRANSMISSION SYSTEM FOR A GAS TURBINE ENGINE

Filed May 13, 1965

INVENTOR:-
AXEL CHARLES WICKMAN
BY:- Glascock, Downing & Seebold
ATTORNEY

INVENTOR:-
AXEL CHARLES WICKMAN

United States Patent Office 3,368,347
Patented Feb. 13, 1968

3,368,347
POWER TRANSMISSION SYSTEM FOR A GAS TURBINE ENGINE
Axel Charles Wickman, 69 S. Washington Drive, St. Armand's Key, Sarasota, Fla. 33578
Filed May 13, 1965, Ser. No. 455,364
Claims priority, application Great Britain, May 22, 1964, 21,152/64; Aug. 28, 1964, 35,306/64
18 Claims. (Cl. 60—39.16)

ABSTRACT OF THE DISCLOSURE

A gas turbine drive for a vehicle in which a first rotor drives a compressor and a second rotor provides the principal driving torque to the drive shaft of the vehicle. An epicyclic gearing interconnects the compressor and the first turbine rotor, and a shaft connected to the reaction member of the epicyclic gearing is also connected by a second gearing to the output shaft of the second turbine rotor, so that any extra torque developed by the first turbine rotor over that required by the compressor will be applied to the vehicle drive shaft. A brake is selectively operable to hold the reaction member of the epicyclic gearing stationary to prevent the vehicle from being driven by the idling torque of the first turbine rotor. Appropriate unidirectional clutch means permits operation of the turbine with the reaction member held stationary, and prevents stalling of the compressor whenever the vehicle coasts by driving the turbines from the output shaft of the vehicle.

---

The invention relates to a power transmission system for a gas turbine engine of the kind including a first turbine rotor capable of driving a compressor at its full capacity, and a second turbine rotor provided with a power output shaft. Hereinafter this kind of gas turbine engine will be identified as "the kind specified."

It has previously been proposed in my Patent specification No. 2,981,063 to provide a power transmission system, for a gas turbine engine of the kind specified, in which the first turbine rotor is connected to drive the compressor through a first overdrive epicyclic gearing of which the reaction member is drivingly connected to a drive shaft, a unidirectional clutch is arranged to prevent the first turbine rotor from rotating faster than the compressor, and the power output shaft of the second turbine rotor and the drive shaft are connected to a common power output shaft through a second gearing which is arranged so that the power output shaft of the second turbine rotor will rotate at a ratio of, but slower than, the speed of the drive shaft.

Modifications of the power transmission system taught by my U.S. Patent No. 2,981,063 dated Apr. 25, 1961 have been proposed in my U.S. Patents Nos. 3,287,903 dated Mar. 20, 1966, and 3,290,878 dated Dec. 13, 1966 which teach, respectively, how the power transmission system may be modified to enable the power developed by the gas turbine engine to be increased without overspeeding the compressor and without losing the advantages obtained by having a differential speed between the drive shaft and the power output shaft of the second turbine rotor whilst the common power output shaft is being accelerated from rest, and how the power transmission system may be modified to enable the first overdrive epicyclic gearing to be arranged operatively between the first turbine rotor and the compressor with its reaction member drivingly connected to a drive shaft without the planet carrier being driven at excessively high speeds, despite the gas turbine engine operating at, say, 45,000 r.p.m.

However, with these prior proposals of mine, a problem has arisen in that the idling of speed of gas turbine engines is usually not less than 15% of the maximum operating speed. Thus, in the case of a gas turbine engine capable of operating at 45,000 r.p.m., the idling speed will not usually be less than 6,750 r.p.m. I have found that, when a gas turbine engine of the kind specified is coupled to a power transmission system as taught by my said prior proposals and is arranged to drive the road wheels of a motor vehicle, the gas turbine engine generates sufficient torque at its idling speed to cause the motor vehicle to creep forwards if its brakes are not applied.

It is an object of this invention to enable a power transmission system according to any of my prior proposals to be coupled to a gas turbine engine of the kind specified whilst preventing the idling torque generated on the reaction member of the first overdrive epicyclic gearing from driving the motor vehicle.

According to the invention a power transmission system, for a gas turbine engine of the kind specified, has a first overdrive epicyclic gearing with a power input member adapted to be driven by the first turbine rotor and a power output member adapted to drive the compressor, a reaction member of the first overdrive epicyclic gearing is drivingly connected to a drive shaft, a unidirectional clutch is arranged to prevent the power input member adapted to be driven by the first turbine rotor ing faster than its power output member, a second gearing connects the power output shaft of the second turbine rotor and the drive shaft to a common power output shaft such that the power output shaft of the second turbine rotor will rotate at a ratio of, but slower than, the speed of the drive shaft, and the reaction member of the first overdrive epicyclic gearing is held rotatively fast with a brake which is operable to hold the reaction member stationary and thus to prevent any torque generated on the reaction member from being transmitted by the drive shaft.

According to a further feature a second unidirectional clutch may be arranged operatively between the reaction member and the second gearing whereby the reaction member is able to transmit torque to the second gearing when the brake is released and the reaction member may be held rotatively stationary by the brake even though the vehicle may still be moving and the drive shaft is accordingly rotating correspondingly.

According to another feature the first unidirectional clutch may be arranged operatively between the compressor and the power input member to the first overdrive epicyclic gearing, and a third unidirectional clutch is arranged operatively between the drive shaft and the power input member to the first overdrive epicyclic gearing whereby, whenever the common power output shaft tends to drive the gas turbine engine, the third unidirectional clutch will lock the drive shaft to the power input member of the first epicyclic gearing thus preventing the compressor from stalling. Alternatively the first overdrive epicyclic gearing may, according to a further feature, be parallelly spaced from the axes of the first turbine rotor and the compressor, a reduction gearing for transmitting drive from the first turbine rotor to the power input member of the first overdrive epicyclic gearing, a multiplication gearing for transmitting drive from the power output member of the first overdrive epicyclic gearing to the compressor, and the first unidirectional clutch is arranged operatively between the drive shaft and one of said members whereby the first unidirectional clutch additionally serves to lock the drive shaft to said one member to prevent the compressor from stalling whenever the common power output shaft tends to drive the gas turbine engine.

According to a further feature, the brake may be operated by a control circuit that is arranged to be actuated by the accelerator of the gas turbine engine and by a road speed sensitive device whereby the brake will hold the reaction member rotatively stationary when the accelerator is at a setting corresponding substantially with engine idling speed and the road speed of the vehicle falls below a predetermined low value.

According to a still further feature the brake may be operated by a solenoid arranged within an electrical control circuit including two electrical switches which are respectively operated when the road speed falls below the said predetermined low value and the accelerator of the gas turbine engine is substantially at a setting corresponding with engine idling speed, and the two switches are arranged in the circuit such that the solenoid will cause the brake to engage only when both switches are operated.

The invention is now described, by way of example only, with reference to the accompanying drawings, in which.

Figure 1:
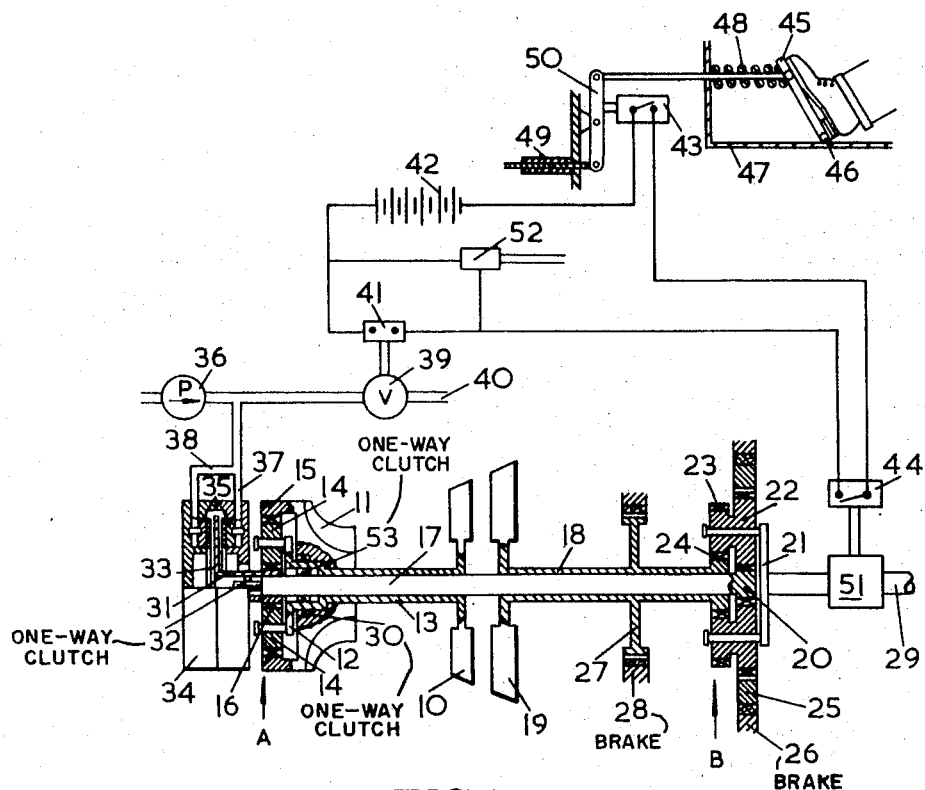
FIGURE 1 illustrates the application of the present invention to the teaching of my Patent Specification No. 2,981,063 and is an axial section through a gas turbine engine of the kind specified coupled to a power transmission system for a road vehicle, and provided with an automatic control circuit.
Figure 1A:
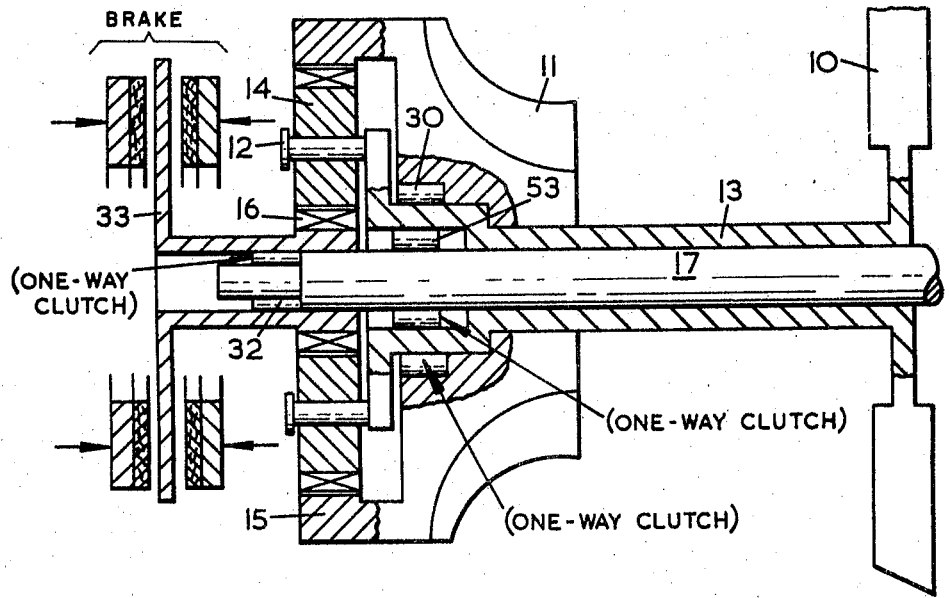
FIGURE 1A is a fragmentary enlargement of gearing A of FIGURE 1.

In FIGURE 1 a gas engine has a first turbine rotor 10 connected to drive a compressor 11 through a first overdrive epicyclic gearing A of which the planet carrier 12 is connected by a hollow shaft 13 to the first turbine rotor 10. A plurality of planet gear wheels 14 are supported by the carrier 12 and mesh with a ring gear wheel 15 fast with the compressor and with a sun gear wheel 16 which constitutes the reaction member of the gearing A. The planet carrier 12 and planet gear 14 constitute planet gear means. The sun gear wheel 16 is connected, in a manner that will be described later, to transmit torque to a drive shaft 17 which extends coaxially through the hollow shaft 13 and through a hollow shaft 18, driven by a second turbine rotor 19, to drive a sun gear wheel 20 of a second underdrive epicyclic gearing B. The latter comprises a planet carrier 21 which supports a plurality of planet gear clusters composed of a larger planet gear wheel 22 formed integral with a smaller planet gear wheel 23 and meshing respectively with the sun gear wheel 20 and with a sun gear wheel 24 driven by the second turbine rotor 19. A ring gear wheel 25 meshes with the planet gear wheel 22 and can either be allowed to rotate freely or be held rotatively stationary by a contractile brake band 26 as shown. A brake drum 27 is rotatively fast with the shaft 18 and can either be held rotatively stationary by a contractile brake band 28 or be allowed to rotate freely as shown.

The gearing B thus transmits the drive from shafts 17 and 18 at a reduced ratio through planet carrier 21 to a common power output shaft 29 which constitutes the vehicle propeller shaft. When brake band 26 is engaged and brake band 28 is released as shown, the propeller shaft 29 is driven in the direction required to propel the vehicle forwards, and when brake band 26 is released and brake band 28 engaged the direction of rotation of the propeller shaft 29 is reversed to propel the vehicle backwards under the power transmitted by shaft 17 only as the second turbine rotor 19 is held against rotation by the brake band 28.

Considering the gas turbine engine being started whilst the vehicle is at rest, the shaft 29 is stationary and this accordingly holds shafts 17 and 18 stationary. When the gas turbine is fired the first turbine rotor 10 accelerates from rest and overdrives the compressor through the first gearing A. Due to the drive from the first turbine rotor to the compressor being transmitted through gearing A, a torque reaction is generated on sun gear wheel 16 and thus on the drive shaft 17, and due to the remanent energy in the gases leaving the first turbine rotor 10 a torque is generated by the second turbine rotor 19 on the shaft 18. When the combined torque exerted by shafts 17 and 18 is sufficient to overcome the rolling resistance of the vehicle, the shaft 29 will start to rotate thus driving the vehicle forwards from rest. As the speed of shaft 29 increases the speed of shafts 17 and 18 will also increase in the manner dictated by the gearing B together with corresponding rotation of sun gear wheel 16 and the second turbine rotor 19. This rotation of sun gear wheel 16 will progressively reduce the overdrive ratio between the first turbine rotor 10 and the compressor 11 until they are rotating at the same speed, and a unidirectional clutch 30 arranged operatively between the compressor 11 and sleeve shaft 13 then engages to prevent the speed of the first turbine rotor 10 from rising above that of the compressor 11.

The gas turbine and power transmission system thus far described is as taught by my U.S. Patent No. 2,981,063. I have now discovered that when the vehicle is at rest with the gas turbine engine idling there is sufficient torque generated on shafts 17 and 18 to overcome the rolling resistance of the vehicle. I have considered reducing the torque generated on the shaft 18 by the second turbine rotor 19 at engine idling speed by allowing the stator defining the reaction nozzles for the second turbine rotor 19 to rotate freely whilst the gas turbine engine is idling and by using a brake to hold the stator stationary when it is desired to propel the vehicle. However, this does not reduce the torque reaction applied by the sun gear wheel 16 to the shaft 29 when the engine is idling. I have found, however, that I can prevent the transmission of any torque reaction from the sun gear wheel 16 to the shaft 29 whilst the engine is idling by making the following modifications:

The sun gear wheel 16 is mounted on a sleeve 31 which is capable of rotation relatively to the drive shaft 17, and a unidirectional clutch 32 is arranged operatively between sleeve 31 and shaft 17 so that the latter may be driven by the sun gear wheel 16. A brake disc 33 is held rotatively fast with the sleeve 31 and is arranged within a casing 34 which is held against rotation in any convenient manner and supports a pair of opposed fluid-operated annular brake pads 35. A pump 36 is connected by passage 37, 38 to supply fluid-pressure to the brake pads 35, and the pressure generated by the pump is regulated by a control valve 39 communicating with exhaust 40. The control valve 39 normally imposes no restriction on the flow of fluid promoted by the pump so that no pressure acts on the brake pads 35 and the sun gear wheel 16 is free to rotate. However, the control valve 39 is operable by a solenoid 41 to restrict the flow of fluid promoted by pump 36 so that the brake pads 35 prevent rotation of the sun gear wheel 16. In this manner the torque reaction developed on the sun gear wheel 16 may be applied to the casing 34 through the brake pads 35 instead of being applied to the drive shaft 17.

The solenoid 41 is arranged in series with a battery 42 and a pair of normally opened switches 43, 44 and thus the operation of control valve 39 to prevent rotation of the sun gear wheel 16 can only occur when both switches 43, 44 are operated to their closed positions. The accelerator pedal 45 for the gas turbine engine is connected at the bottom by a hinge 46 to the vehicle floor 47 and is movable against a compression coil spring 48 to operate a sheathed cable 49 through a centrally-pivoted lever 50. Switch 43 is arranged to be operated to the closed position by the upper portion of lever 50 when the pedal 45 is released. A speed responsive device 51 such as a governor, is driven by the propeller shaft 29 and is arranged to operate switch 44 to the closed position when the vehicle speed falls below a predetermined low speed, for instance, below ten miles per hour. Thus, whenever the accelerator pedal is released and the speed of the vehicle is less than ten miles per hour, the sun gear wheel 16 will be held against rotation and no torque will be applied to shaft 17 which is free to rotate due to the action of the unidirectional clutch 32.

Although the torque reaction of the sun gear wheel 16 on drive shaft 17 is transferred to casing 34 when the circuit to the solenoid 41 is completed as just described, as soon as the accelerator pedal 45 is depressed the switch 43 breaks the circuit of solenoid 41 and the torque reaction of the sun gear wheel 16 is again applied to the drive shaft 17.

However, a disadvantage occurs in that when the vehicle overruns, that is the vehicle drives the engine, the unidirectional clutch 32 will break the drive between the drive shaft 17 and the sun gear wheel 16 thus breaking the drive to the compressor 11. As the gas turbine engine is essentially tending to brake the vehicle during an overrun condition, the speed of the first turbine rotor 10 will drop and because the drive shaft 17 is prevented by the unidirectional clutch 32 from imparting a drive to the compressor 11 the latter could stall unless the overrun condition is of very short duration. However, this disadvantage can be overcome by arranging a further unidirectional clutch 53 between the drive shaft 17 and the hollow shaft 13 which drivingly interconnects the first turbine rotor 10 to planet carrier 12 of gearing A. The unidirectional clutch 53 is arranged so that the drive shaft 17 will drive the hollow shaft 13 and thus the compressor 11 during overrun conditions thus preventing the latter from stalling. The operation of the unidirectional clutch 53 is best appreciated if shaft 17 is considered to be rotating faster than sun gear wheel 16 due to the free wheeling condition of unidirectional clutch 32. The unidirectional clutch 53 is locked due to the overrun condition of the vehicle so that drive shaft 17 drives the planet carrier 12 of gearing A and thus the planet gear wheels 14 will react on the sun gear wheel 16 and the ring gear wheel 15. As the latter is under load due to the windage of the compressor 11, the planet gear wheels tend to accelerate the sun gear wheel 16, which is under no load, until it is rotating as fast as the drive shaft 17 whereupon unidirectional clutch 32 will engage and the compressor will be driven at the same speed as the drive shaft 17 through the unidirectional clutch 53.

As the present invention does not lend itself particularly well to the teaching of my U.S. Patent No. 3,287,903 as shown in FIGURE 1 due to the requirement for the additional unidirectional clutch 53 to prevent the unsatisfactory operation of the compressor during an overrun condition, I prefer to apply the teaching of the present invention to the gas turbine power transmission system disclosed in my U.S. Patent No. 3,290,878 in the manner now described with reference to FIGURE 2 in which components common with FIGURE 1 have been given the same reference numerals and may be considered as having the same function and operation unless indicated to the contrary.

Figure 2A:
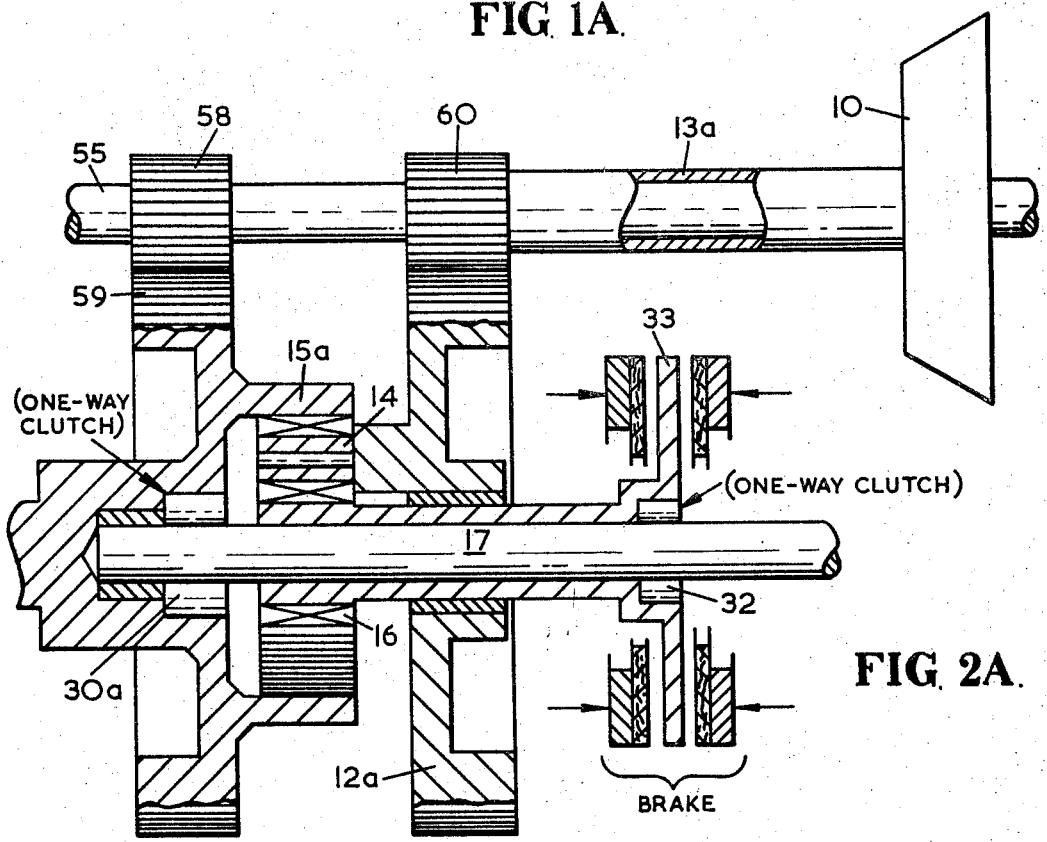
FIGURE 2A is a fragmentary enlargement of gearing A of FIGURE 2.
Figure 2:
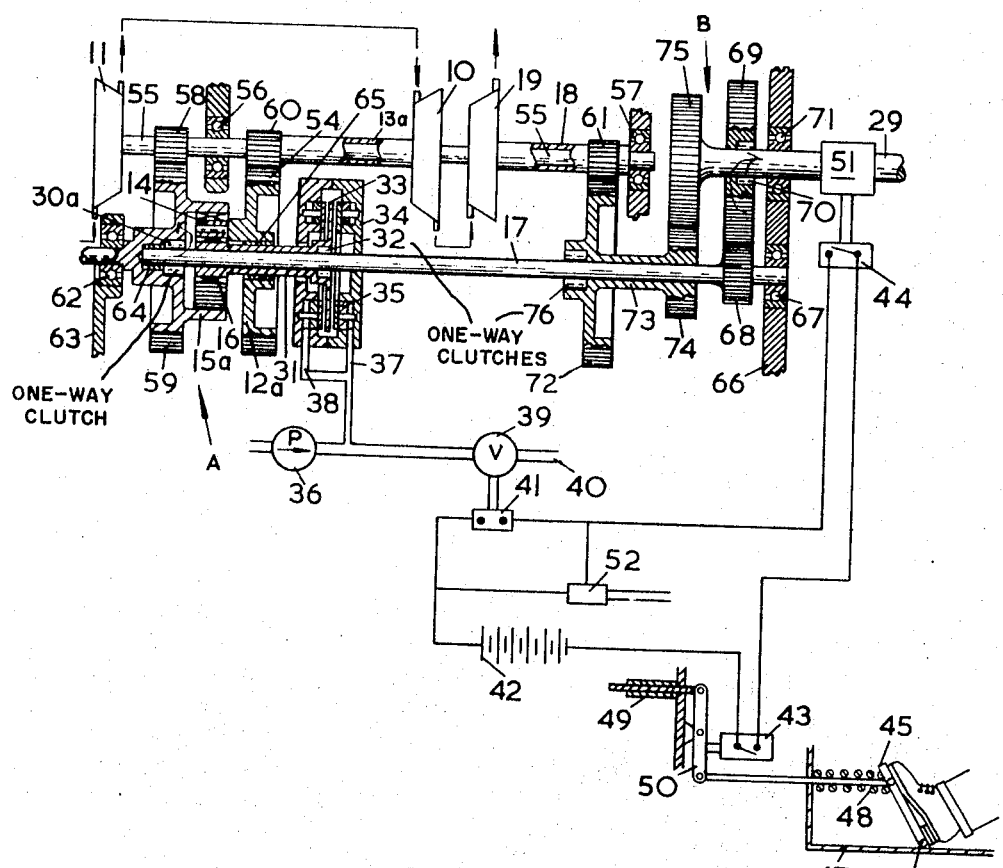
FIGURE 2 is a similar view but illustrating the application of the present invention to the teaching of my U.S. Patent No. 3,290,878.

In FIGURE 2 an epicyclic overdrive gearing is indicated generally at A and a reduction gearing at B. The power input member of gearing A is a planet carrier 12a which is driven by a gear wheel 54 and carries a series of planet gear wheels 14 meshing with a ring gear wheel 15a and with a sun gear wheel 16 which constitutes the reaction member of gearing A. The compressor 11 is mounted on a shaft 55 supported by bearings 56, 57 and is drivingly connected to a gear wheel 58 which is driven by a gear wheel 59 formed integral with the ring gear wheel 15a.

The first turbine rotor 10 and the second turbine rotor 19 are rotatively supported by respective tubular shafts 13a and 18 from the shaft 55 intermediate bearings 56 and 57, and drive respective gear wheels 60, 61. In this manner the first turbine rotor 10 is connected to drive the planet carrier 12a through a reduction gearing 60, 54 of which the ratio is such as to allow the maximum speed of the first turbine rotor to exceed the maximum safe speed of the planet carrier 12a without causing the latter to exceed its maximum safe speed. The multiplication gearing 59, 58 between the gearing A and the compressor 11 is of the same ratio as that of the reduction gearing 60, 54 whereby to counteract the effect of the latter on the speed of the compressor.

The gear wheel 59 and the ring gear wheel 15a are supported by a bearing 62 from a casing 63 and by a bush 64 from a drive shaft 17 which is drivingly connected to the sun gear wheel 16 in a manner that will be described later and extends through a bush 65 of gear wheel 54. The end of the drive shaft 17 remote from the sun gear wheel 16 is supported from a casing 66 by a bearing 67 and is drivingly connected to a gear wheel 68 which is arranged to drive a common power output shaft 29 through a gear wheel 69 and a unidirectional clutch 70 which allows the common power output shaft 29 to rotate faster than gear wheel 69. The common power output shaft 29 is aligned with the shaft 55 and is supported from the casing 66 by a bearing 71.

The common power output shaft 29 is also connected to be driven by the second turbine rotor 19 through the tubular shaft 18, gear wheel 61, a gear wheel 72 rotatively supported from the drive shaft 17 by a hub 73, a gear wheel 74 drivingly connected to gear wheel 72, and a gear wheel 75 coaxially fast with the common power output shaft 29.

FIGURE 2 as thus far described is identical in construction and operation as the gas turbine engine described in my Patent No. 3,290,878. However, in order to modify this construction in accordance with the teaching of the present invention so as to prevent the torque reaction on the sun gear wheel 16 from being applied to the common power output shaft 29 when the engine is idling and the vehicle is at rest, the sun gear wheel 16 is mounted on a sleeve 31 which is provided with a brake disc 33 and a unidirectional clutch 32 in exactly the same manner as described with reference to FIGURE 1. The brake disc 33 is also controlled in exactly the same manner as previously described and it is therefore unnecessary to repeat its mode of operation. During overrun conditions the unidirectional clutch 32 will freewheel as previously described breaking the drive from the drive shaft 17 to the sun gear wheel 16. However, the unidirectional clutch 30a will lock and the drive shaft 17 will drive the compressor 11 directly through gear wheels 59 and 58 thus preventing the compressor 11 from stalling.

When the vehicle in which the power transmission system is installed is at rest with the gas turbine engine not started, the common power output shaft 29, which is connected to drive the road wheels of the vehicle, will be held stationary by the resistance of the vehicle against the initiation of motion and, consequently, drive shaft 17 and sun gear wheel 16 will be held stationary by the engagement of gears 68 and 69.

When the gas turbine engine is started, the first turbine rotor 10 will drive the compressor 11 at an overdrive ratio through reduction gearing 60 and 54, overdrive epicyclic gearing A and multiplication gearing 59 and 58 without causing the planet carrier 12a to be driven above its safe maximum speed, and the torque reaction on sun gear wheel 16 will be absorbed by brake disc 33 until released, then to the road wheels through drive shaft 17, gear wheels 68 and 69 and unidirectional clutch 70. At the same time, the torque generated on the second turbine rotor 19 will be applied to the road wheels through reduction gearing 61 and 72, and gear wheels 74 and 75.

The torque reaction on the common power output shaft 29 will cause the vehicle to accelerate from rest. As the speed of the vehicle increases, the speed of the drive shaft 17 and the speed of the hub 73 will increase differentially due to the difference in the ratios of the reduction gear trains 68 and 69, and 74 and 75. For instance, if the ratio of gears 68 and 69 is 1:3 and the ratio of gears 74 and 75 is 1:1½ as shown in the drawing, hub 73 will rotate at half the speed of drive shaft 17. It will be appreciated that, as the drive shaft 17 accelerates, the sun gear wheel 16 will accelerate and the overdrive ratio of the compressor 11 will diminish until the latter rotates at the same speed as the first turbine rotor 10. When this occurs the unidirectional clutch 30a will lock the drive shaft 17 to the ring gear wheel 15a and, as the unidirectional clutch 32 is already locking the sun gear wheel 16 to the drive shaft 17, the sun gear wheel 16 is effectively locked to the ring gear wheel 15a thus preventing the speed of the first turbine rotor 10 from exceeding the speed of the compressor 11.

When the unidirectional clutches 30a and 32 are engaged, the drive shaft 17 is driven at the same speed as gear wheel 54 which is determined by the speed of the first turbine rotor 10 and the ratio of gear wheels 54 and 60, for instance 5:1 as shown in the drawing. It will be noted that, when shaft 17 is locked by clutch 30a to ring gear 15a, the planet carrier 12a cannot attain a speed in excess of the speed of shaft 17 due to clutch 32 locking the sun gear wheel 16 to the shaft 17. As the ratio of gear wheels 72 and 61 is also 5:1, and as the hub 73 rotates at half the speed of drive shaft 17 as previously explained, it will be seen that whilst the speed of the first turbine rotor 10 has been increasing, the speed of the second turbine rotor 19 has increased so that it is half the speed of the first turbine rotor.

The power output of the first turbine rotor 10 is therefore divided between the compressor 11 and the common power output shaft 17 whilst the power output of the second turbine rotor 19 is transmitted solely to the common power output shaft 29. However, as the speed of the compressor 11 increases it will require a larger proportion of the power output from the first turbine rotor 10 and the second turbine rotor 19 will provide a larger proportion of the power transmitted to the common power output shaft 29. Eventually, the second turbine rotor 19 will produce sufficient power to cause the unidirectional clutch 70 to freewheel so that the total power transmitted by the common power output shaft 17 is derived from the second turbine rotor 19, and so that the compressor 11 is provided with the whole power output of the first turbine rotor 10, the reaction on the sun gear wheel 16 being transmitted to the gear wheel 59 by unidirectional clutch 30a.

As the unidirectional clutch 70 starts to freewheel, the speed of the second turbine rotor 19 will increase to a value above half the speed of the first turbine rotor 10. A further unidirectional clutch 76 is arranged between the drive shaft 17 and the hub 73 to prevent the latter from rotating faster than the drive shaft 17 and thus to prevent the speed of the second turbine rotor 19 from exceeding the speed of the first turbine rotor 10.

When the vehicle tends to overrun the engine the unidirectional clutch 70 will freewheel, but the unidirectional clutches 30a and 76 will lock so that the compressor 11 will be driven through gear wheels 58, 59, 74 and 75 from the common power output shaft 29. In this manner the power required to motor the compressor 11 will provide engine braking, and the positive drive from the common power output shaft 29 to both the turbine rotors 10 and 19 and to the compressor 11 will prevent the gas turbine from stalling whilst the vehicle is overrunning and the first turbine rotor 10 produces only idling power.

If desired the gearing B may be modified in any known manner to provide a reverse drive. For instance, it may be modified in accordance with the teaching of FIGURE 3 of my U.S. Patent No. 3,287,903.

What I claim as my invention and desire to secure by Letters Patent of the United States is:

1. A power transmission system for a gas turbine engine including a compressor, a first turbine rotor capable of driving said compressor at its full capacity, a second turbine rotor and a power output shaft therefor, said power transmission system being provided with a first overdrive epicyclic gearing including a power input member, means coupling the power input member to said first turbine rotor so that it is driven by the first turbine rotor, a power output member, a reaction member, means coupling the power output member to said compressor so that it is driven by the power output member, and a drive shaft, means coupling the drive shaft to said reaction member so that said drive shaft is driven by said reaction member, unidirectional clutch means interconnecting at least two of said members to prevent said power input member from rotating faster than said power output member, a common power output shaft, a second gearing connecting the drive shaft and the power output shaft of the second turbine rotor to drive said common power output shaft, said second gearing being of a ratio such that the power output shaft of the second turbine rotor will turn slower than the drive shaft, a brake element fixed to said reaction member and selectively operable means to hold said brake element so that the reaction member may be held stationary to prevent torque generated on said reaction member from being transmitted by the drive shaft.

2. A power transmission system, as in claim 1, further comprising a control circuit for operating said selectively operable brake means, an accelerator control for the gas turbine engine, a speed sensitive device driven by the common power output shaft, said accelerator control and said speed sensitive device being arranged jointly to actuate said control circuit for operating the selectively operable brake means whenever both the accelerator control is at a setting corresponding substantially with engine idling speed and the speed of the common power output shaft falls below a predetermined low value.

3. A power transmission system, as in claim 1, further comprising a solenoid for operating said selectively operable brake means, a control circuit for actuating said solenoid, a speed sensitive device driven by the common power output shaft, a first switch arranged in said control circuit to be operated by the speed sensitive device to be closed whenever the speed of the common power output shaft falls below a predetermined low value, an accelerator control for the gas turbine engine, a second switch arranged to be closed by the accelerator control when the latter is at a setting corresponding substantially with engine idling speed, and said two switches being arranged in series in said control circuit so that said solenoid will only be actuated to operate said brake when both of the switches are closed.

4. A power transmission system, as in claim 1, in which said unidirectional clutch means interconnects said power input member and said power output member.

5. A power transmission system for a gas turbine engine including a compressor, a first turbine rotor capable of driving said compressor at its full capacity, a second turbine rotor provided with a power output shaft, an overdrive epicyclic gearing including a power input member driven by the first turbine rotor, a power output member connected to drive said compressor, a reaction member, and a drive shaft connected to said reaction member to be driven thereby, a first unidirectional clutch means interconnecting at least two of said members to prevent said power input member from rotating faster than said power output member, a common power output shaft, a second gearing connecting the drive shaft and the power output shaft of the second turbine rotor to drive said common power output shaft at a ratio so that the power output shaft of the second turbine rotor will rotate more slowly than the drive shaft, a brake element fixed to said reaction member, selectively operable means to hold said brake element so that the reaction member may be held stationary to prevent torque generated on the reaction member from being transmitted by the drive shaft, and a second unidirectional clutch means interconnecting said reaction member and said second gearing whereby the reaction member can transmit drive in one direction to the second gearing when the brake means is released and the reaction member can be held rotatively stationary by the brake means even though the second gearing may be rotating.

6. A power transmission system, as in claim 5, additionally comprising a third unidirectional clutch means interconnecting the drive shaft and said power input member whereby, whenever the common power output shaft tends to drive the gas turbine engine, said third unidirectional clutch means will lock the drive shaft to said power input member thereby preventing the compressor from stalling.

7. A power transmission system, as in claim 5, further comprising a control circuit for operating said selectively operable brake means, an accelerator control for the gas turbine engine, a speed sensitive device driven by the common power output shaft, said accelerator control and said speed sensitive device being arranged jointly to actuate said control circuit for operating the selectively operable brake means whenever both the accelerator control is at a setting corresponding substantially with engine idling speed and the speed of the common power output shaft falls below a predetermined low value.

8. A power transmission system, as in claim 5, further comprising a solenoid for operating said selectively operable brake means, a control circuit for actuating said solenoid, a speed sensitive device driven by the common power output shaft, a first switch arranged in said control circuit to be operated by the speed sensitive device to be closed whenever the speed of the common power output shaft falls below a predetermined low value, an accelerator control for the gas turbine engine, a second switch arranged to be closed by the accelerator control when the latter is at a setting corresponding substantially with engine idling speed, and said two switches being arranged in series in said control circuit so that said solenoid will only be actuated to operate said brake when both of the switches are closed.

9. A power transmission system, as in claim 6, further comprising a control circuit for operating said selectively operable brake means, an accelerator control for the gas turbine engine, a speed sensitive device driven by the common power output shaft, said accelerator control and said speed sensitive device being arranged jointly to actuate said control circuit for operating the selectively operable brake means whenever both the accelerator control is at a setting corresponding substantially with engine idling speed and the speed of the common power output shaft falls below a predetermined low value.

10. A power transmission system, as in claim 6, further comprising a solenoid for operating said selectively operable brake means, a control circuit for actuating said solenoid, a speed sensitive device driven by the common power output shaft, a first switch arranged in said control circuit to be operated by the speed sensitive device to be closed whenever the speed of the common power output shaft falls below a predetermined low value, an accelerator control for the gas turbine engine, a second switch arranged to be closed by the accelerator control when the latter is at a setting corresponding substantially with engine idling speed, and said two switches being arranged in series in said control circuit so that said solenoid will only be actuated to operate said brake when both of the switches are closed.

11. A power transmission system for a gas turbine engine including a compressor, a first turbine rotor capable of driving said compressor at its full capacity, a second turbine rotor provided with a power output shaft, said power transmission system being provided with a first overdrive epicyclic gearing parallelly spaced from the axes of the first turbine rotor and the compressor, a reduction gearing for transmitting drive from the first turbine rotor, a multiplication gearing driving said compressor, said first epicyclic gearing including a power input member driven by said reduction gearing, a power output member from said first overdrive epicyclic gearing drivingly connected to said multiplication gearing, a reaction means for said first overdrive epicyclic gearing, and a drive shaft, a common power output shaft, a further gearing connecting the drive shaft and the power output shaft of the second turbine rotor to drive said common power output shaft, said second gearing being of a ratio such that the power output shaft of the second turbine rotor will rotate more slowly than the drive shaft, a brake means connected to said reaction means, said brake means being operable to hold the reaction means stationary to prevent torque generated on the reaction means from being transmitted to the drive shaft, a first unidirectional clutch means connecting the drive shaft and one of said members of said first epicyclic gearing to lock the drive shaft to said one member to prevent the compressor from stalling whenever said common power output shaft tends to drive the gas turbine engine, and a second unidirectional clutch means connecting the reaction means and the drive shaft whereby the reaction means can transmit torque to the said drive shaft and thereby to said further gearing when the brake means is released and the reaction means can be held rotatively stationary by the brake means even though the drive shaft may be rotating.

12. A power transmission system for a gas turbine engine including a compressor, a first turbine rotor capable of driving said compressor at its full capacity, a second turbine rotor provided with a power output shaft, a first overdrive epicyclic gearing including a power input member driven by the first turbine rotor, a power output member drivingly connected to said compressor, a reaction member, and a drive shaft, unidirectional clutch means between at least two of said members to prevent said power input member from rotating faster than said power output member, a common power output shaft, a second gearing connecting the drive shaft and the power output shaft of the second turbine rotor to drive said common power output shaft, said second gearing being of a ratio such that the power output shaft of the second turbine rotor will rotate more slowly than the drive shaft member, a brake element connected to said reaction member, and brake means associated with said brake element operable to hold the reaction member stationary to prevent torque generated on the reaction member from being transmitted to the drive shaft, a control circuit for operating said brake means, an accelerator control for the gas turbine engine, a speed sensitive device driven by the common power output shaft, said accelerator control and said speed sensitive device being arranged jointly to actuate said control circuit for operating the brake means whenever the accelerator control is at a setting corresponding substantially with engine idling speed and the speed of the common power output shaft falls below a predetermined low value.

13. A power transmission system for a gas turbine engine including a compressor, a first turbine rotor capable of driving said compressor at its full capacity and a second turbine rotor provided with a power output shaft, a first overdrive epicyclic gearing including a power input member driven by the first turbine rotor, a power output member connected to drive said compressor, a reaction member, and a drive shaft member, a unidirectional clutch means interengaging at least three of said members to prevent said power input member from rotating faster than said power output member, a common power output shaft, a second gearing connecting said drive shaft member and the power output shaft of the second turbine rotor to drive said common power output shaft, said second gearing being such that the power output shaft of the second turbine rotor will rotate slower than said drive shaft member, brake means selectively engageable with said reaction member, said brake means being selectively operable to hold the reaction member stationary to prevent torque generated on the reaction member from being transmitted to the drive shaft member, said unidirectional clutch means including an element interconnecting the reaction member and said drive shaft member whereby the reaction member will transmit torque to the second gearing through said drive shaft member when the brake means is released and the reaction member can be held rotatively stationary by the brake means even though the drive shaft member may be rotating, a control circuit connected selectively to operate said brake means, an accelerator control for the gas turbine engine, a speed sensitive device driven by the common power output shaft, said accelerator control and said speed sensitive device being arranged jointly to actuate said control circuit to operate said brake means to hold said reaction member stationary whenever the accelerator control is at a setting corresponding substantially with engine idling speed and the speed of the common power output shaft falls below a predetermined low value.

14. A power transmission system for a gas turbine engine including a compressor, a first turbine rotor capable of driving said compressor at its full capacity and a second turbine rotor provided with a power output shaft, a first overdrive epicyclic gearing comprising an input member, output member, and reaction member, spaced from and parallel to the axes of the first turbine rotor and the compressor, a reduction gearing transmitting power from the first turbine rotor to said power input member, a multiplication gearing driven by the power output member from said first overdrive epicyclic gearing connected to drive said compressor, a first unidirectional clutch means connecting said drive shaft to said reaction member, a common power output shaft, a further gearing connecting the drive shaft at a ratio to the power output shaft of the second turbine rotor and to said common power output shaft such that the power output shaft of the second turbine rotor will rotate more slowly than the drive shaft, a brake means connected to said reaction member, said brake means being selectively operable to hold the reaction member stationary to prevent torque generated on the reaction member from being transmitted to the drive shaft, a second unidirectional clutch means interconecting the drive shaft and another of said members to prevent said power input member from rotating faster than said power output member and to lock the drive shaft to said another member to prevent the compressor from stalling whenever said common power output shaft tends to drive the gas turbine engine, whereby the reaction member can transmit torque to said further gearing by means of said first unidirectional clutch means and said drive shaft when the brake means is released, and the reaction member can be held rotatively stationary by the brake means while the drive shaft is rotating, said transmission system also including a control circuit means operating said brake means, an accelerator control for the gas turbine engine, a speed sensitive device driven by the common power output shaft, said accelerator control and said speed sensitive device being arranged jointly to actuate said control circuit means for operating the brake means whenever both the accelerator control is at a setting corresponding substantially with engine idling speed and the speed of the common power output shaft falls below a predetermined low value.

15. A power transmission system for a gas turbine engine including a compressor, a first turbine rotor capable of driving said compressor at its full capacity and a second turbine rotor provided with a power output shaft, an overdrive epicyclic gearing including a power input member driven by the first turbine rotor, a power output member driving the compressor, a reaction member, and a drive shaft connected to said reaction member to be driven thereby, a unidirectional clutch interconnecting at least two of said members to prevent said power input member from rotating faster than said power output member, a common power output shaft, a second gearing connecting the drive shaft and the power output shaft of the second turbine rotor to drive said common power output shaft at a ratio so that the power output shaft of the second turbine rotor will rotate more slowly than the drive shaft, a brake element fixed to rotate with said reaction member, selectively operable brake means to hold said brake element so that the reaction member may be held stationary to prevent torque generated on the reaction member from being transmitted by the drive shaft, a solenoid means operating said selectively operable brake means, a control circuit for actuating said solenoid, a speed sensitive device driven by the common power output shaft, a first switch arranged to be operated by the speed sensitive device whenever the speed of the common power output shaft falls below a predetermined low value, an accelerator control for the gas turbine engine, a second switch arranged to be operated by the accelerator control when the latter is at a setting corresponding substantially with engine idling speed, and said two switches being arranged in series in said control circuit so that said solenoid will only be actuated when both of the switches are operated.

16. A power transmission system for a gas turbine engine including a compressor, a first turbine rotor capable of driving said compressor at its full capacity and a second turbine rotor provided with a power output shaft, a first overdrive epicyclic gearing including a power input member driven by the first turbine rotor, a power output member driving said compressor, a reaction member, and a drive shaft connected to said reaction member to be driven thereby, a second gearing, a first unidirectional clutch means interconnecting said reaction member and said second gearing, a second unidirectional clutch means interconecting at least two of said members to prevent said power input member from rotating faster than said power output member, a common power output shaft, a second gearing connecting the drive shaft and the power output shaft of the second turbine rotor to drive said comon power output shaft, the gear ratio of said second gearing providing that the power output shaft of the second turbine rotor will rotate at a ratio of but slower than said drive shaft, a brake element mounted to rotate with said reaction member, selectively operable brake means to hold said brake element so that the reaction member may be held stationary to prevent torque generated on the reaction member from being transmitted by the drive shaft, said reaction member transmitting torque to the second gearing through said drive shaft when the brake constituted by said brake means and said complementary brake means is released, and the reaction member being held rotatively stationary by the brake when the complementary brake means is operated even though the drive shaft may be rotating, a solenoid means for operating said selectively operable brake means, a control circuit for actuating said solenoid, a speed sensitive device driven by the common power output shaft, a first switch arranged to be operated by the speed sensitive device whenever the speed of the common power output shaft falls below a predetermined low value, an accelerator control for the gas turbine engine, a second switch arranged to be operated by the accelerator control when the latter is at a setting corresponding substantially with engine idling speed, and said two switches being arranged in series in said control circuit so that said solenoid will only be actuated when both of the switches are operated.

17. A power transmission system for a gas turbine engine including a compressor, a first turbine rotor capable of driving said compressor at its full capacity and a second turbine rotor provided with a power output shaft, a first overdrive epicyclic gearing including a power input member, a power output member, and a reaction member, said epicyclic gearing being spaced from and parallel to the axes of the first turbine rotor and said compressor, a reduction gearing for transmitting power from the first turbine rotor to said power input member, a multiplication gearing connected to said power output member and to said compressor, a drive shaft coaxial of said reaction member, a first unidirectional clutch arranged operatively between the reaction member and said drive shaft whereby the reaction member can transmit torque to said drive shaft, a common power output shaft, a further gearing connecting the drive shaft and the power output shaft of the second turbine rotor and said common power output shaft, said further gearing having a gear ratio such that the power output shaft of the second turbine rotor will rotate more slowly than the speed of the drive shaft, brake means rotatively fixed with respect to said reaction member, complementary brake means operable to hold said reaction member stationary to prevent torque generated on the reaction member from being transmitted to said drive shaft, second unidirectional clutch means interengaging the drive shaft and one of said members to prevent said power input member from rotating faster than said power output member and to lock the drive shaft to said one member to prevent the compressor from stalling whenever said common power output shaft tends to drive the gas turbine engine, whereby when the complementary brake means is operated the reaction member can be held rotatively stationary by the brake means while the first unidirectional clutch permits the drive shaft to rotate, a solenoid for operating said complementary brake means, a control circuit for actuating said solenoid, a speed sensitive device driven by the common power output shaft, a first switch arranged to be operated by the speed sensitive device whenever the speed of the common power output shaft falls below a predetermined low value, an accelerator control for the gas turbine engine, a second switch arranged to be operated by the accelerator control when the latter is at a setting corresponding substantially with engine idling speed, and said two switches being arranged in series in said control circuit such that said solenoid will only be actuated when both of the switches are operated.

18. In a power transmission system for gas turbines of the kind including a compressor, a first turbine rotor capable of driving said compressor at its full capacity and a second turbine rotor provided with a power output shaft, an epicyclic gearing including a sun gear element, a ring gear member, and a planet carrier member supporting planetary gear means meshing with said sun gear element and said ring gear member, means connecting said first turbine rotor to said planetary carrier member to rotate said planetary gear means, means connecting said ring gear member to said compressor whereby said compressor is driven, and including releasable brake means connected to said sun gear element, whereby said sun gear element may be selectively held stationary, a drive shaft member extending coaxially of said sun gear element, first one-way clutch means connecting said sun gear element and said drive shaft member to drive said drive shaft member in the same direction of rotation as said planetary carrier member, and to permit said drive shaft member to rotate in that direction faster than said sun gear element, and second one-way clutch means interconnecting two of said members to prevent said planet carrier member from rotating faster than said ring gear member, said power transmission system including further gearing interconnecting said drive shaft member and said power output shaft of said second turbine rotor, and means connected to said further gearing to provide power takeoff from said transmission.

References Cited
UNITED STATES PATENTS

| | | | |
|---|---|---|---|
| 2,981,063 | 4/1961 | Wickman | 60—39.16 |
| 3,287,903 | 11/1966 | Wickman | 60—39.16 |
| 3,290,878 | 12/1966 | Wickman | 60—39.16 |

JULIUS E. WEST, *Primary Examiner.*